(12) United States Patent
Kurosawa

(10) Patent No.: US 11,474,462 B2
(45) Date of Patent: Oct. 18, 2022

(54) IMAGE FORMING APPARATUS WITH MISALIGNMENT CORRECTION CAPABILITY

(71) Applicant: TOSHIBA TEC KABUSHIKI KAISHA, Tokyo (JP)

(72) Inventor: Norio Kurosawa, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/549,010

(22) Filed: Dec. 13, 2021

(65) Prior Publication Data

US 2022/0100131 A1 Mar. 31, 2022

Related U.S. Application Data

(63) Continuation of application No. 17/016,921, filed on Sep. 10, 2020, now Pat. No. 11,226,576.

(51) Int. Cl.
*G03G 15/20* (2006.01)
*G03G 15/00* (2006.01)
(Continued)

(52) U.S. Cl.
CPC ....... *G03G 15/2042* (2013.01); *G03G 15/205* (2013.01); *G03G 15/2039* (2013.01);
(Continued)

(58) Field of Classification Search
CPC ............. G03G 15/2042; G03G 15/205; G03G 15/5062; G03G 2215/00569; G03G 2215/00759
(Continued)

(56) References Cited

U.S. PATENT DOCUMENTS 10,488,793 B2  11/2019  Sako et al.
10,824,103 B1  11/2020  Doi
(Continued)

FOREIGN PATENT DOCUMENTS

JP  H06-270431 A    9/1994
JP  2010-197668 A   9/2010
JP  2015-141206 A   8/2015

OTHER PUBLICATIONS

U.S. Notice of Allowance on U.S. Appl. No. 17/016,921 dated Sep. 14, 2021.
(Continued)

*Primary Examiner* — Robert B Beatty
(74) *Attorney, Agent, or Firm* — Foley & Lardner LLP

(57) ABSTRACT

An image forming device includes an image forming unit, a fuser, a memory, and a control circuit. The image forming unit forms an image on a recording medium with a decolorable toner based on image data. The decolorable toner decolorizes at a first temperature and does not decolorize at a second temperature that is lower than the first temperature. The fuser has a plurality of regions extending in a direction orthogonal to a direction of conveyance of the recording medium. The fuser generates heat in each of the plurality of regions to fuse the image onto the recording medium. The memory stores a correspondence between the plurality of regions and positions of a plurality of areas positioned along a main scanning direction in the image data. The control circuit changes the correspondence based on a degree of color development or decolorization of the image.

6 Claims, 10 Drawing Sheets

(51) Int. Cl.
   *G06K 15/00*         (2006.01)
   *G06K 15/12*         (2006.01)
(52) U.S. Cl.
   CPC .................. *G03G 15/5062* (2013.01); *G03G 2215/00569* (2013.01); *G03G 2215/00759* (2013.01); *G06K 15/129* (2013.01); *G06K 15/408* (2013.01)
(58) Field of Classification Search
   USPC .................................. 399/15, 223, 334, 341
   See application file for complete search history.

(56)              References Cited

U.S. PATENT DOCUMENTS

2014/0016958 A1    1/2014   Yabuuchi et al.
2016/0070213 A1    3/2016   Arima
2016/0085187 A1    3/2016   Takagi
2017/0363999 A1   12/2017   Miyauchi et al.
2018/0067428 A1    3/2018   Takagi

OTHER PUBLICATIONS

U.S. Office Action on U.S. Appl. No. 17/016,921 dated May 12, 2021.

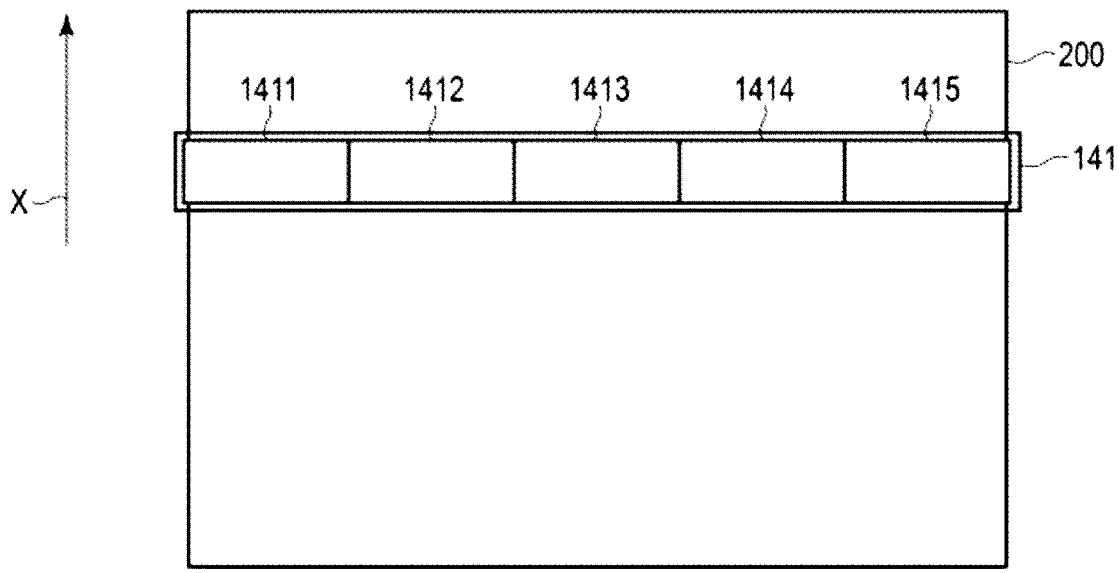

IMAGE FORMING APPARATUS WITH MISALIGNMENT CORRECTION CAPABILITY

CROSS-REFERENCE TO RELATED PATENT APPLICATION

This application is a continuation of U.S. patent application Ser. No. 17/016,921, filed Sep. 10, 2020, which is incorporated herein by reference in its entirety.

FIELD

Embodiments described herein relate generally to an image forming device.

BACKGROUND

There is a split-heating fuser having a plurality of heating units split in a direction orthogonal to the direction of conveyance of a recording medium. In such a fuser, each of the plurality of heating units generates heat according to an area where an image is to be fused in a main scanning direction.

However, the fuser may be slightly misaligned from a correct position of installation into a direction orthogonal to the direction of conveyance of the recording medium due to assembly error. In such a case, the area where heat is generated in the fuser does not easily coincide with the area where an image is to be fused. If the area where heat is generated in the fuser does not coincide with the area where an image is to be fused, a part of the image is not fused to the recording medium. To restrain the probability that a part of the image may not be fused to the recording medium, the area where heat is generated in the fuser may be made broader than the area where the image is to be fused. In this case, a heating unit that originally should not generate heat generates heat, thus causing an excess load on the fuser.

DESCRIPTION OF THE DRAWINGS

FIG. 4 shows a schematic configuration example of a heating member.

FIG. 5 shows a plurality of default image detection areas.

DETAILED DESCRIPTION

Figure 1:
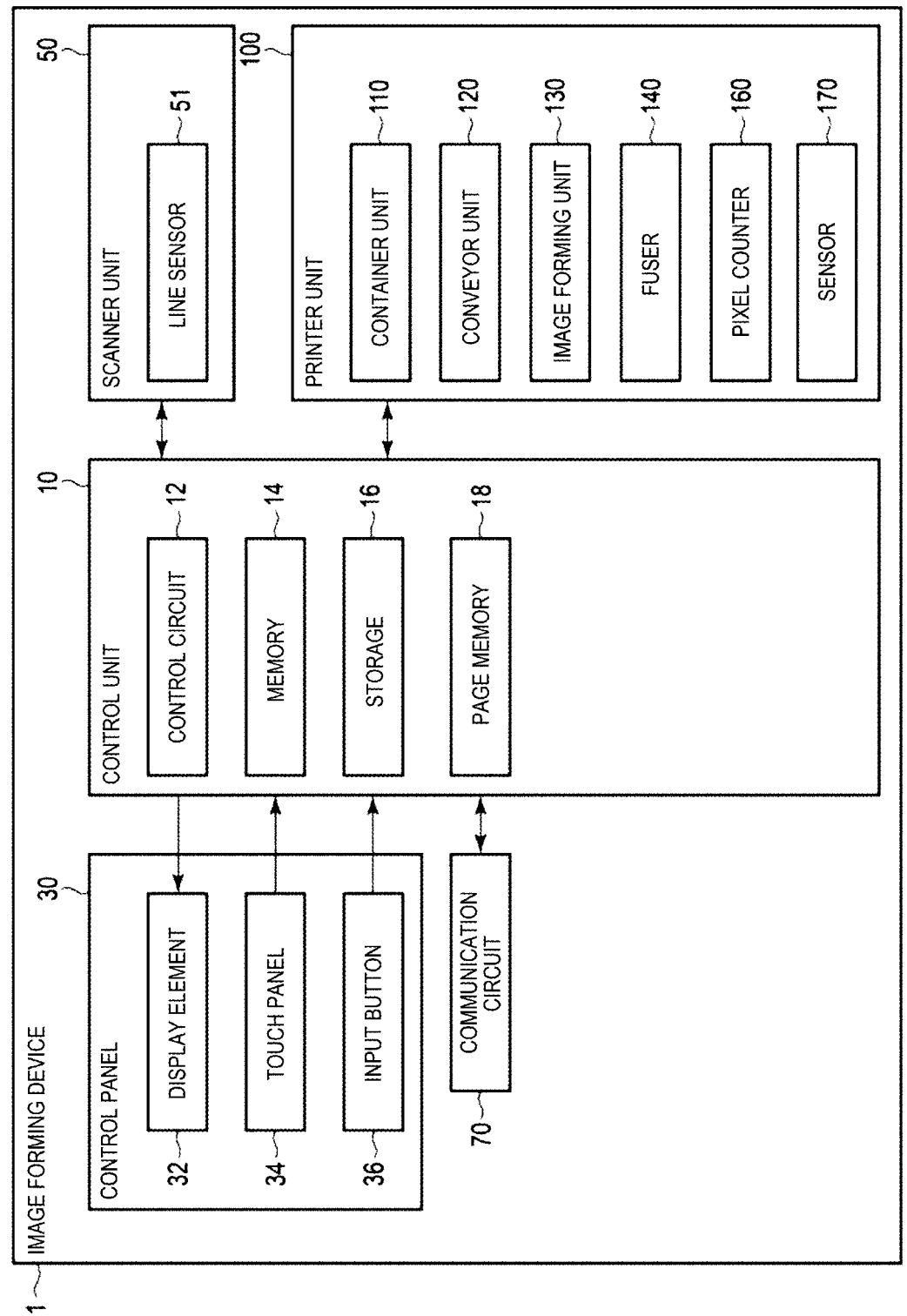
FIG. 1 is a block diagram showing a schematic configuration example of an image forming device according to an embodiment.

In general, according to one embodiment, an image forming device has an image forming unit, a fuser, a memory unit, and a control circuit. The image forming unit is configured to form, on a recording medium, an image based on image data with a decolorable toner which decolorizes at a first temperature and does not decolorize at a second temperature that is lower than the first temperature. The fuser is configured to generate heat with the first temperature or the second temperature in each of a plurality of regions split in a direction orthogonal to a direction of conveyance of the recording medium and to fuse the image formed with the decolorable toner onto the recording medium. The memory unit is configured to store a correspondence between the plurality of regions in the fuser and positions of a plurality of areas split in a main scanning direction in the image data. The control circuit is configured to change the correspondence, based on a degree of color development or decolorization by the fuser of the image formed with the decolorable toner on the recording medium, to detect presence or absence of a print target image in each of the plurality of areas in print target image data that is different from the image data, and to cause the fuser to generate heat in one or more regions of the plurality of regions in the fuser corresponding to one or more areas where the print target image is detected, of the plurality of areas.

An embodiment will now be described with reference to the drawings. An image forming device according to this embodiment is a device having an electrophotographic printing function. In this embodiment, it is assumed that the image forming device is a digital multifunction peripheral (MFP) having a copy function, a print function, a facsimile function, a scanner function and the like. The image forming device can perform non-decolorable printing and decolorable printing.

Non-decolorable printing is suitable for preparing a document to be saved. Non-decolorable printing uses a non-decolorable toner. The non-decolorable toner is also referred to as a permanent toner, normal toner or the like.

Decolorable printing is printing to prepare a document where a printed letter or the like can be "erased". Decolorable printing uses a decolorable toner. The decolorable toner is a toner which decolorizes in response to an external stimulus such as temperature, light of a specific wavelength, or pressure. In this embodiment, it is assumed that the decolorable toner is a toner which decolorizes when the toner is subjected to heat of a predetermined temperature or higher. In this embodiment, "decolorization" means that an image of a letter or the like formed with a different color from the underlying color of a sheet is made invisible. The "color" includes not only a chromatic color but also an achromatic color such as white or black. The decolorable toner decolorizes at a first temperature and does not decolorize at a second temperature that is lower than the first temperature. The first temperature is a temperature at which an image is decolorized. The second temperature is a temperature equal to or higher than a temperature at which an image formed with the decolorable toner is fused and color-developed. The second temperature is a temperature at which an image is not decolorized.

Configuration of Device

FIG. 1 is a block diagram showing a schematic configuration example of an image forming device 1 according to this embodiment. As shown in FIG. 1, the image forming device 1 has a control unit 10, a control panel 30, a scanner unit 50 (scanner), a communication circuit 70, and a printer unit 100 (printer).

The control unit 10 controls the operation of each part or component of the image forming device 1. The control unit 10 includes a control circuit 12 (controller), a memory 14, a storage 16, and a page memory 18.

The control circuit 12 includes, for example, a processor such as a central processing unit (CPU). The control circuit 12 may include an application-specific integrated circuit (ASIC), field-programmable gate array (FPGA), and/or graphics processing unit (GPU), or the like, instead of or in addition to the CPU.

The memory 14 can include a read-only memory (ROM) and a random-access memory (RAM). The ROM has, for example, a startup program or the like recorded therein. The RAM functions, for example, as a main memory of the CPU.

The storage 16 includes, for example, a hard disk drive (HDD). The storage 16 may include a semiconductor memory medium or the like such as a solid-state drive (SSD), instead of or in addition to the HDD. In the storage 16, a control program and various kinds of information such as parameters used by the CPU are recorded. Also, print target image data can be recorded in the storage 16. The storage 16 is an example of a memory unit. The page memory 18 is a memory having a memory area where image data corresponding to at least one page is loaded. The image data is transferred from the page memory 18 to the storage 16.

The control panel 30 can include a display element 32 (display), a touch panel 34, and an input button 36. The display element 32 is a display element such as a liquid crystal display or organic electroluminescence (EL) display. The display element 32 displays information such as the state of the image forming device 1 and various settings. The display element 32 also displays options or the like to change the settings or the like of the image forming device 1. The touch panel 34 is provided on the display element 32. The touch panel 34 together with the display element 32 may form a touch screen. The touch panel 34 acquires an instruction by a user. The input button 36 includes, for example, a print start button. The input button 36 acquires an instruction by the user.

The scanner unit 50 scans an image of a letter, geometric figure, photograph, or the like drawn on a recording medium placed at a predetermined position. Therefore, the scanner unit 50 includes a line sensor 51. The line sensor 51 may employ a charge-coupled device (CCD) system, contact image sensor (CIS) system, or other systems. The line sensor 51 is an example of an image pickup element. The scanner unit 50 generates image data based on an image scanned using the line sensor 51. The scanner unit 50 transmits the generated image data to the control unit 10. The control unit 10 saves the received image data in the storage 16, transmits the received image data to the printer unit 100, or transmits the received image data to another device via the communication circuit 70.

The communication circuit 70 is a circuit for communicating with a device outside the image forming device 1. The image forming device 1 is connected to a personal computer (PC) or the like, for example, via the communication circuit 70 and a network connected to the communication circuit 70. The image forming device 1 is also connected to a telephone line via the communication circuit 70.

The printer unit 100 forms an image on a recording medium (e.g., paper, etc.). The printer unit 100 forms an image on the surface of the recording medium, based on the image data generated by the scanner unit 50. The printer unit 100 may also form an image on the surface of the recording medium, based on image data transmitted from another information processing device via a network.

Here, the printer unit 100 using a tandem-type toner image transfer unit is described as an example. The printer unit 100 has a container unit 110 (container, tray, etc.), a conveyor unit 120 (conveyor assembly), an image forming unit 130 (image applicator, image former), a fuser 140, a pixel counter 160, and a sensor 170. The container unit 110 stores a recording medium such as paper, cloth, or plastic film. The recording medium is conveyed by the conveyor unit 120 from the container unit 110 to the image forming unit 130 and then to the fuser 140. The image forming unit 130 forms an image of a letter, geometric figure, photograph or the like on the recording medium. The fuser 140 fuses the image formed on the recording medium. In this way, the printer unit 100 prints the image on the recording medium. The pixel counter 160 counts pixels forming the print target image. The sensor 170 detects the image fused on the recording medium.

Figure 2:
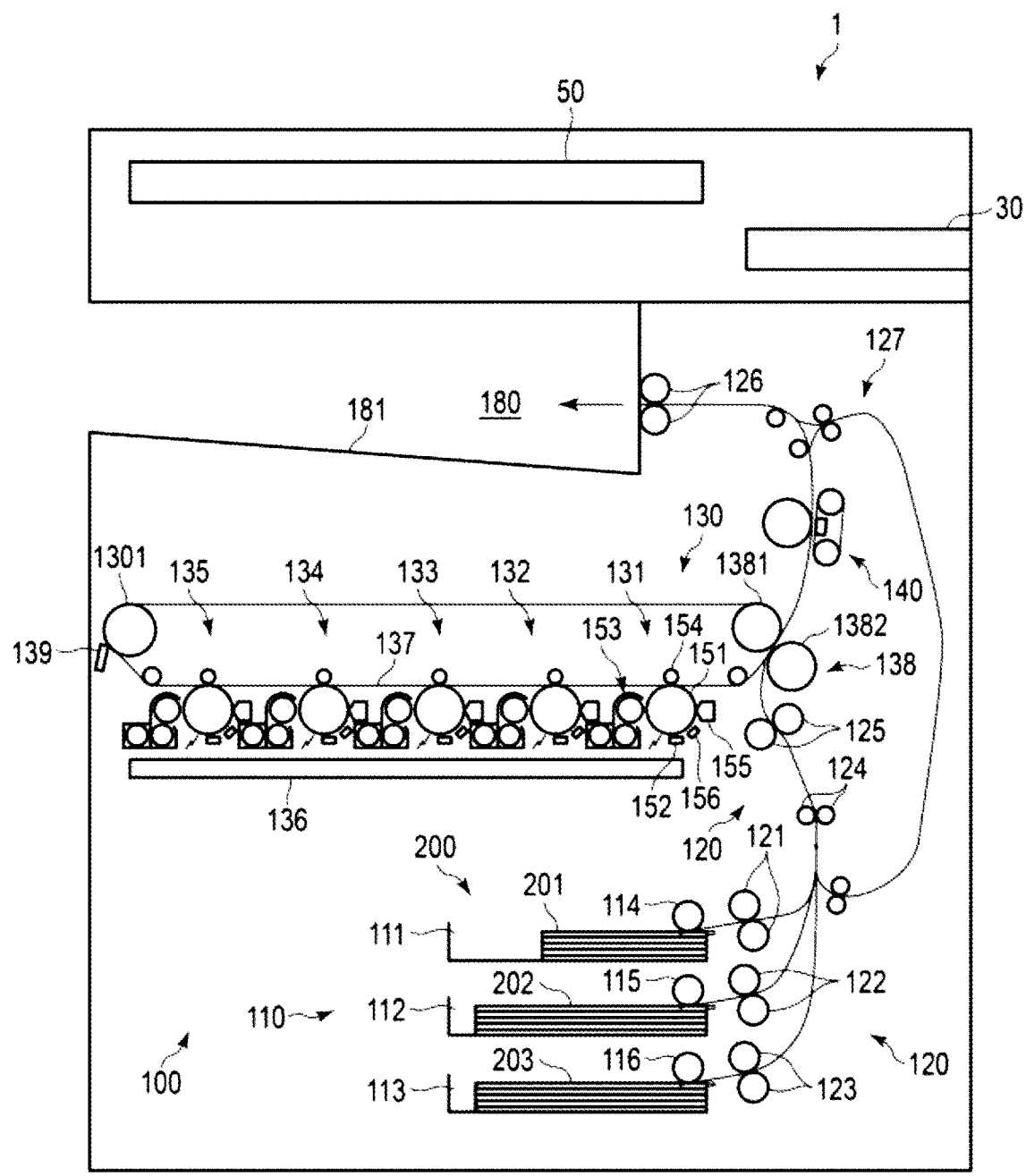
FIG. 2 shows a schematic configuration example of a printer unit.

FIG. 2 shows a schematic configuration example of the printer unit 100. The printer unit 100 will now be described with reference to FIG. 2.

The container unit 110 has a plurality of paper cassettes or trays. In the example shown in FIG. 2, the container unit 110 has a first paper cassette 111, a second paper cassette 112, and a third paper cassette 113. Each paper cassette contains a recording medium 200 of a predetermined size and type. That is, the first paper cassette 111 contains a first recording medium 201. The second paper cassette 112 contains a second recording medium 202. The third paper cassette 113 contains a third recording medium 203. While an example where three paper cassettes are provided is described here, the number of paper cassettes may be one or any number.

Each paper cassette has a pickup roller. That is, the first paper cassette 111 has a first pickup roller 114. The second paper cassette 112 has a second pickup roller 115. The third paper cassette 113 has a third pickup roller 116. Each pickup roller picks up the recording media 200 one by one from each paper cassette. Each pickup roller supplies the picked-up recording medium 200 to the conveyor unit 120.

The conveyor unit 120 conveys the recording medium 200 in the printer unit 100. The conveyor unit 120 has conveyor rollers 121 to 124, a registration roller 125, and a conveyor roller 126. The conveyor roller 121 conveys the first recording medium 201 supplied by the first pickup roller 114 to the conveyor roller 124. The conveyor roller 122 conveys the second recording medium 202 supplied by the second pickup roller 115 to the conveyor roller 124. The conveyor roller 123 conveys the third recording medium 203 supplied by the third pickup roller 116 to the conveyor roller 124. The conveyor roller 124 conveys the recording medium 200 further to the registration roller 125. The registration roller 125 conveys the recording medium 200 to a transfer unit 138 of the image forming unit 130, described later, according to a timing when the transfer unit 138 transfers a toner image to the recording medium 200. The conveyor roller 126 is provided downstream of the fuser 140 and discharges the recording medium 200 to a paper discharge unit 180. The paper discharge unit 180 may be an opening or tray having a paper receiving surface 181. The conveyor unit 120 can have a reversing unit 127 which reverses the recording medium 200 when forming an image on both sides of the recording medium 200.

The image forming unit 130 forms a toner image on the surface of the recording medium 200. The image forming unit 130 has a plurality of development units 131 to 135, an exposure unit 136, an intermediate transfer belt 137, a transfer unit 138, a supply unit, not illustrated, and a transfer belt cleaner 139. The plurality of development units 131 to 135 are provided corresponding to the number of types of toner.

In the example shown in FIG. 2, the image forming unit 130 is configured to be able to perform non-decolorable black-and-white printing and color printing, and decolorable single-color printing. That is, the image forming unit 130 has a black development unit 131, a cyan development unit 132, a magenta development unit 133, a yellow development unit 134, and a decolorable development unit 135. The black development unit 131 is a development unit corresponding to a black (K) toner. The cyan development unit 132 is a development unit corresponding to a cyan (C) toner. The magenta development unit 133 is a development unit corresponding to a magenta (M) toner. The yellow development unit 134 is a development unit corresponding to a yellow (Y) toner. The decolorable development unit 135 is a development unit corresponding to a decolorable toner. These development units have configurations similar to each other.

Each development unit has a photosensitive drum 151 which functions as an image carrier. Each development unit has a charger 152, a developing device 153, a primary transfer roller 154, a cleaning unit 155, and a static eliminator 156.

The intermediate transfer belt 137 is an endless belt. The intermediate transfer belt 137 is supported between the photosensitive drum 151 and the primary transfer roller 154 of each development unit. The intermediate transfer belt 137 is also supported by a support roller 1381 and a support roller 1301 of the transfer unit 138. The intermediate transfer belt 137 turns counterclockwise in FIG. 2.

The photosensitive drum 151 has a photosensitive layer on the surface. The photosensitive drum 151 rotates about a shaft clockwise in FIG. 2. The charger 152 uniformly charges the photosensitive layer on the surface of the photosensitive drum 151. For example, the charger 152 negatively charges the surface of the photosensitive drum 151.

The exposure unit 136 is provided at a position facing the photosensitive drum 151 of each development unit. The exposure unit 136 has a semiconductor laser light source. The exposure unit 136 casts laser light onto the surface of the photosensitive drum 151 of each development unit via an optical system such as a polygon mirror. Under the control of the control unit 10, operations of the exposure unit 136 including light emission are controlled, based on image data. On the surface of the photosensitive drum 151, an electrostatic pattern is formed as an electrostatic latent image at the position irradiated with the laser light. The exposure unit 136 may use an light-emitting diode (LED) instead of the laser light source.

The developing device 153 develops the electrostatic latent image on the surface of the photosensitive drum 151 with a toner. That is, the toner adheres to the electrostatic latent image on the photosensitive drum 151. Thus, a toner image is formed on the surface of the photosensitive drum 151.

The primary transfer roller 154 holds the intermediate transfer belt 137 with the photosensitive drum 151 on the opposite side. The primary transfer roller 154 functions as a bias roller. The primary transfer roller 154 transfers the toner image on the surface of the photosensitive drum 151 to the intermediate transfer belt 137. This transfer is referred to as primary transfer. The black development unit 131, the cyan development unit 132, the magenta development unit 133, and the yellow development unit 134 can perform multiple transfers of toner images of their respective colors to the intermediate transfer belt 137.

The cleaning unit 155 is provided at the rear of the position where the toner image on the surface of the photosensitive drum 151 is transferred to the intermediate transfer belt 137. The cleaning unit 155 scrapes and removes the toner or the like that has not been transferred from the surface of the photosensitive drum 151. The toner removed by the cleaning unit 155 is collected in a waste toner tank and is disposed of.

The static eliminator 156 faces the photosensitive drum 151 cleaned by the cleaning unit 155. The static eliminator 156 casts light onto the surface of the cleaning unit 155. This casting of light eliminates static electricity from the photosensitive layer and makes the electric charge in the photosensitive layer uniform.

The transfer unit 138 has the support roller 1381 and a secondary transfer roller 1382. The support roller 1381 and the secondary transfer roller 1382 are configured to hold the intermediate transfer belt 137 and the recording medium 200 from both sides of the direction of thickness. The support roller 1381 is a drive roller for the intermediate transfer belt 137. The secondary transfer roller 1382 faces the support roller 1381 with the intermediate transfer belt 137 held. The transfer unit 138 transfers the charged toner image on the surface of the intermediate transfer belt 137 to the surface of the recording medium 200. This transfer is referred to as secondary transfer.

The transfer belt cleaner 139 is arranged between the transfer unit 138 and the development units in the direction of movement of the intermediate transfer belt 137. The transfer belt cleaner 139 eliminates the toner on the surface of the intermediate transfer belt 137 that has not been transferred, after the toner image is transferred from the intermediate transfer belt 137 to the recording medium 200.

The fuser 140 applies heat and pressure to the recording medium 200. With this heat and pressure, the fuser 140 fuses the toner image transferred to the recording medium 200. For example, the fuser 140 fuses an image formed with a decolorable toner on the recording medium 200. A configuration example of the fuser 140 will be described later.

The fuser 140 can also heat the recording medium 200 printed with a decolorable toner to a temperature at which an image is decolorized or higher, and thus decolorize the image printed on the recording medium 200. That is, the image forming device 1 can function as an image forming and image erasing device that can form an image and can erase an image.

Configuration of Fuser

Figure 3:
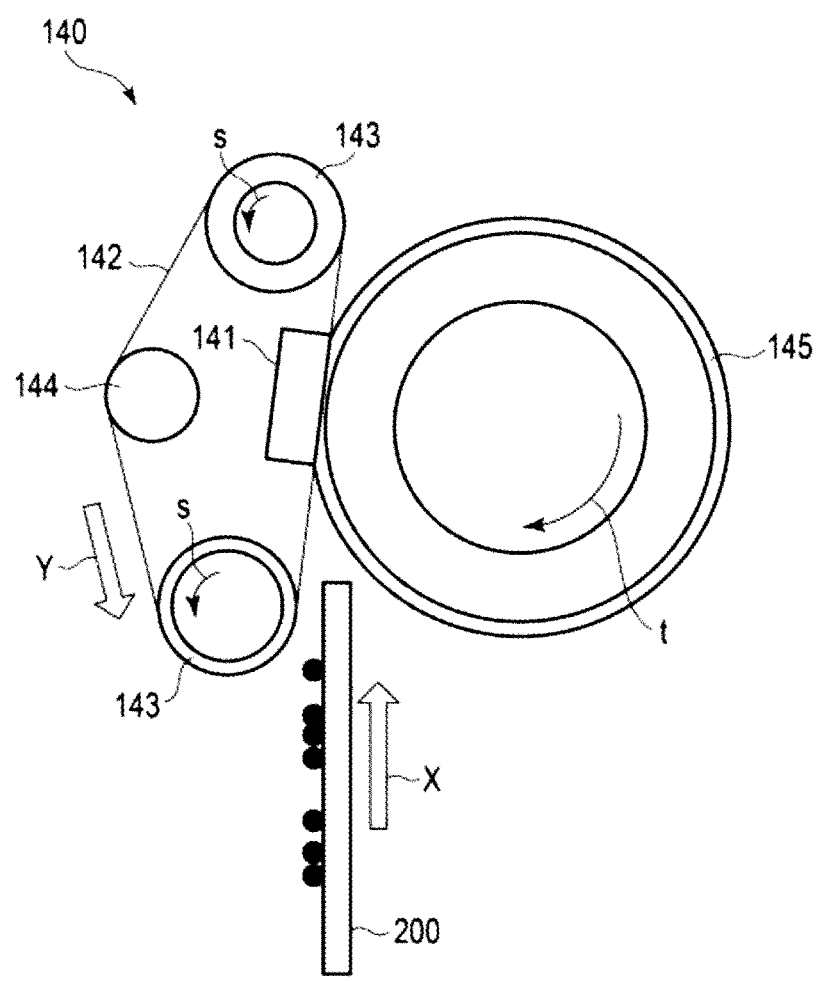
FIG. 3 shows a schematic configuration example of a fuser.

FIG. 3 shows a schematic configuration example of the fuser 140. The fuser 140 has a heating member 141 (heater, heating element, thermal element, etc.), an endless belt 142, a conveyor roller 143, a tension roller 144, and a press roller 145. An arrow X indicates the direction of conveyance of the recording medium 200.

The heating member 141 is a plate-like member. The heating member 141 is in contact with the inner side of the endless belt 142 on its heating unit side. The heating member 141 is pressed against the press roller 145 and thus forms a fixing nip of a predetermined width with the press roller 145. A configuration example of the heating member 141 will be described later.

The endless belt 142 is formed of, for example, (i) a SUS base material with a thickness of 50 μm or polyimide, which is a heat-resistant resin, with a thickness of 70 μm, and (ii) a silicone rubber layer with a thickness of 200 μm formed on the outside thereof. The outermost circumference of the endless belt 142 is covered with a surface protection layer of Perfluoroalkoxy Polymer (PFA) or the like. An arrow Y indicates the direction in which the endless belt 142 turns.

The conveyor roller 143 is a roller driving the endless belt 142. An arrow s indicates the direction of rotation of the conveyor roller 143. The tension roller 144 is a roller applying a tensile force to the endless belt 142. The press roller 145 is a roller having an elastic layer formed on the surface. The press roller 145 is formed of, for example, an iron rod with a diameter of 10 mm and a silicone sponge layer with a thickness of 5 mm formed on the surface of the iron rod. The outermost circumference of the press roller 145 is covered with a surface protection layer of PFA or the like. An arrow t indicates the direction of rotation of the press roller 145.

FIG. 4 shows a schematic configuration example of the heating member 141. The heating member 141 extends in a direction orthogonal to the direction of conveyance X of the recording medium 200. The direction of conveyance X corresponds to a sub-scanning direction. The direction orthogonal to the direction of conveyance X corresponds to a main scanning direction. The heating member 141 has a plurality of heating units (heaters, heating elements, etc.) split in the direction orthogonal to the direction of conveyance X. The plurality of heating units may also be referred to as a plurality of heating regions or a plurality of regions. The heating member 141 has the plurality of heating units arranged symmetrically about the center in the direction orthogonal to the direction of conveyance X. For example, the heating member 141 has, in order from one end, a first heating unit 1411, a second heating unit 1412, a third heating unit 1413, a fourth heating unit 1414, and a fifth heating unit 1415. The fuser 140 generates heat in each of the first heating unit 1411, the second heating unit 1412, the third heating unit 1413, the fourth heating unit 1414, and the fifth heating unit 1415. For example, in the fuser 140, each of the first heating unit 1411, the second heating unit 1412, the third heating unit 1413, the fourth heating unit 1414, and the fifth heating unit 1415 generates heat with a temperature at which an image is decolorized or with a temperature at which an image is not decolorized. In this description, it is assumed that the heating units except the heating units at the two ends have the same width in the direction orthogonal to the direction of conveyance X. However, these heating units may have different widths. The width in the direction orthogonal to the direction of conveyance X, of the heating units at the two ends, can be set to be greater than the width of the heating units except the heating units at the two ends. The number of heating units provided in the heating member 141 may be any plural number and is not limited to five.

Outline of Image Forming Operation of Printer Unit

An outline of an image forming operation of the printer unit 100 will now be described. The printer unit 100 operates under the control of the control unit 10. When forming an image based on an instruction by the user, the control unit 10 causes each part or component of the printer unit 100 to operate in the following manner.

The conveyor unit 120 conveys the recording medium 200 from the container unit 110. In response to a charging bias voltage from a power supply, not illustrated, the charger 152 charges the photosensitive drum 151. The exposure unit 136 casts laser light onto the photosensitive drum 151 based on inputted image data. An electrostatic latent image is formed at the position irradiated with the laser light on the photosensitive drum 151. The developing device 153 supplies a toner to the surface of the photosensitive drum 151 where the electrostatic latent image is formed.

For example, to perform non-decolorable black-and-white printing, the developing device 153 in the black development unit 131 develops the electrostatic latent image on the surface of the photosensitive drum 151 with a black (K) toner. To perform decolorable printing, the developing device 153 in the decolorable development unit 135 develops the electrostatic latent image on the surface of the photosensitive drum 151 with a decolorable toner.

To perform non-decolorable color printing, the developing device 153 in the yellow development unit 134 develops the electrostatic latent image on the surface of the photosensitive drum 151 with a yellow (Y) toner. The developing device 153 in the magenta development unit 133 develops the electrostatic latent image on the surface of the photosensitive drum 151 with a magenta (M) toner. The developing device 153 in the cyan development unit 132 develops the electrostatic latent image on the surface of the photosensitive drum 151 with a cyan (C) toner. The developing device 153 in the black development unit 131 develops the electrostatic latent image on the surface of the photosensitive drum 151 with a black (K) toner.

In response to a primary transfer bias voltage applied from the power supply to the primary transfer roller 154, the photosensitive drum 151 transfers the toner image to the intermediate transfer belt 137. A required toner image or toner images of the decolorable toner image, the yellow (Y) toner image, the magenta (M) toner image, the cyan (C) toner image, and the black (K) toner image are primary-transferred to the intermediate transfer belt 137.

The conveyor unit 120 conveys the recording medium 200 to the transfer unit 138. In response to a secondary transfer bias voltage applied from the power supply to the secondary transfer roller 1382, the intermediate transfer belt 137 transfers the toner image to the recording medium 200 at the transfer unit 138. The recording medium 200 having the toner image transferred thereto is conveyed to the fuser 140. The fuser 140 applies heat and pressure to the recording medium 200 and fuses the toner image transferred to the recording medium 200.

To form an image on both sides of the recording medium 200, the reversing unit 127 reverses the recording medium 200 after the fusing. The reversing unit 127 conveys the reversed recording medium 200 to the conveyor roller 124. Then, an image is formed again. The recording medium 200, after the fusing, is discharged from the paper discharge unit 180 by the conveyor unit 120. The image forming operation thus ends.

Outline of a Plurality of Image Detection Areas

A plurality of image detection areas is a plurality of areas split in the main scanning direction for detecting presence or absence of a print target image in image data. The splitting in the main scanning direction refers to splitting a maximum area in the main scanning direction of an image that can be formed on the recording medium 200. The plurality of image detection areas may be a plurality of areas split in the sub-scanning direction as well as in the main scanning direction in the image data. The splitting in the sub-scanning direction refers to splitting a maximum area in the sub-scanning direction of an image that can be formed on the recording medium 200. The plurality of image detection areas is also referred to as a plurality of areas. The plurality of image detection areas are used to control selective heat generation at the first heating unit 1411, the second heating unit 1412, the third heating unit 1413, the fourth heating unit 1414, and the fifth heating unit 1415.

An example of detecting presence or absence of a print target image will now be described. The pixel counter 160 counts pixels in each of the plurality of image detection areas. In an example, the pixel counter 160 counts the number of pixels in an electrostatic latent image formed on the photosensitive drum 151 by the exposure unit 136 and thus counts the number of pixels in each of the plurality of image detection areas. In another example, the pixel counter 160 counts pixels in image data loaded in the page memory 18 and thus counts the number of pixels in each of the plurality of image detection areas. The control circuit 12 detects presence or absence of a print target image in each of the plurality of image detection areas, based on the result of the counting by the pixel counter 160.

The storage 16 stores information about a plurality of image detection areas that is currently set. The plurality of image detection areas that is currently set is also referred to as a current plurality of image detection areas. For example, the information about the plurality of image detection areas is information about the correspondence between the plurality of heating units of the fuser 140 and the positions of the plurality of image detection areas split in the main scanning direction in the image data. The information about the plurality of image detection areas includes information about coordinates specifying the plurality of image detection areas. For example, the coordinates specifying the plurality of image detection areas are coordinates of the boundary between image detection areas, of the plurality of image detection areas. The current plurality of image detection areas may be a default plurality of image detection areas or a plurality of image detection areas changed from the default plurality of image detection areas.

FIG. 5 shows the default plurality of image detection areas. The default plurality of image detection areas are areas split in the sub-scanning direction as well as in the main scanning direction. The default plurality of image detection areas are areas split in a column a, a column b, a column c, a column d, and a column e in the main scanning direction and also split in a plurality of rows in the sub scanning direction. All of the width Wa of the column a, the width Wb of the column b, the with Wc of the column c, the width Wd of the column d, and the width We of the column e are Z. Z is the same size as the width of the heating units except the heating units at the two ends of the heating member 141. The total of the width Wa of the column a, the width Wb of the column b, the width Wc of the column c, the width Wd of the column d, and the width We of the column e is equivalent to the maximum area in the main scanning direction of the image that can be formed on the recording medium 200. The rows in the sub-scanning direction may have the same width or different widths from each other. The capital alphabetic letters shown in FIG. 5 represent the rows in the sub-scanning direction. The combinations of capital and small alphabet letters shown in FIG. 5 represent the image detection areas specified by the corresponding columns and rows.

Setting of the Plurality of Image Detection Areas

The control circuit 12 sets information about a plurality of image detection areas, based on the degree of color development or decolorization by the fuser 140 of an image formed with a decolorable toner on the recording medium 200, as described below. The degree of color development or decolorization is the state of color development or decolorization. The setting of the information about the plurality of image detection areas includes maintaining the information about the current plurality of image detection areas. The setting of the information about the plurality of image detection areas includes changing the information about the current plurality of image detection areas to information about new plurality of image detection areas.

First, the control circuit 12 controls the image forming unit 130 to form an image with a decolorable toner on the recording medium 200. Thus, the image forming unit 130 forms the image with a decolorable toner on the recording medium 200.

Figure 6:
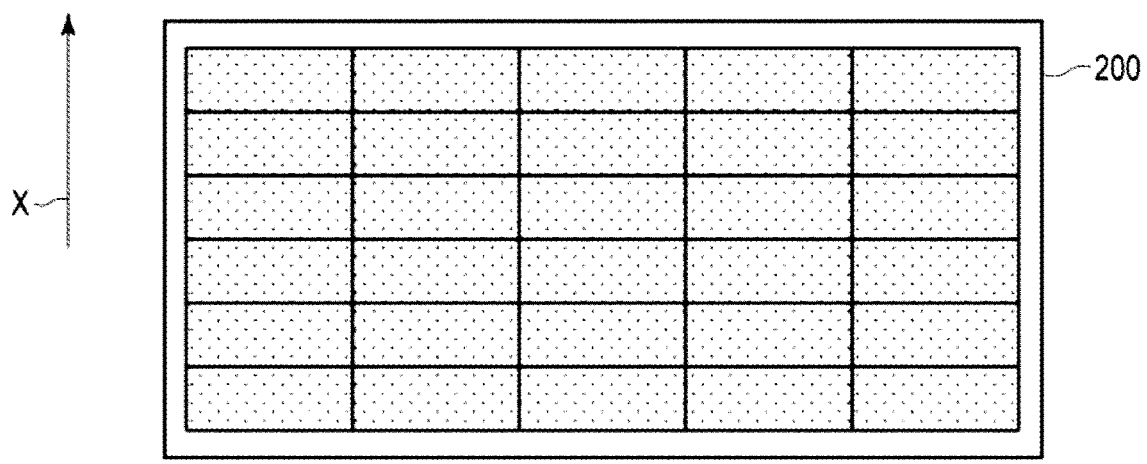
FIG. 6 shows an example of an image formed with a decolorable toner.

FIG. 6 shows an example of the image formed with a decolorable toner on the recording medium 200. In FIG. 6, the current plurality of image detection areas superimposed on the image are shown for the sake of convenience of the description. However, the current plurality of image detection areas are not formed on the recording medium 200. For example, the image formed with a decolorable toner on the recording medium 200 is an image ranging over a maximum area in the main scanning direction and a maximum area in the sub-scanning direction that can be formed on the recording medium 200. Therefore, the image coincides with the current plurality of image detection areas. The image may be any image ranging over the maximum area in the main scanning direction that can be formed on the recording medium 200 and may not range over the entire area in the sub-scanning direction.

Next, the control circuit 12 controls the conveyor unit 120 to convey the recording medium 200 having the image formed with a decolorable toner to the fuser 140. Under the control of the control circuit 12, the fuser 140 causes the plurality of heating units to generate heat with a temperature at which the image formed with the decolorable toner is decolorized or with a temperature at which the image formed with the decolorable toner is not decolorized. For example, the plurality of heating units generate heat with the temperature at which the image is decolorized or with the temperature at which the image is not decolorized, alternately in order of arrangement. That is, one of two heating units next to each other, of the plurality of heating units of the fuser 140, generates heat with the temperature at which the image is decolorized. The other of the two heating units next to each other generates heat with the temperature at which the image is not decolorized. Thus, the fuser 140 can form a boundary between a color-developed part of the image and a decolorized part of the image corresponding to the boundary between heating units of the plurality of heating units, on the recording medium 200. Here, it is assumed that the second heating unit 1412 and the fourth heating unit 1414 generate heat with the temperature at which the image is decolorized. It is assumed that the first heating unit 1411, the third heating unit 1413, and the fifth heating unit 1415 generate heat with the temperature at which the image is not decolorized. However, the first heating unit 1411, the third heating unit 1413, and the fifth heating unit 1415 may generate heat with the temperature at which the image is decolorized. In this case, the second heating unit 1412 and the fourth heating unit 1414 generate heat with the temperature at which the image is not decolorized.

Figure 7:
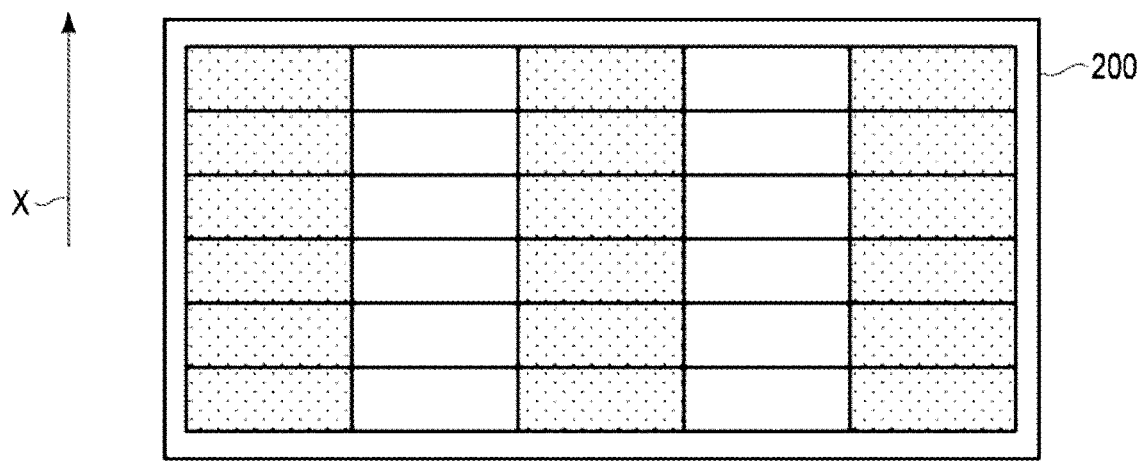
FIG. 7 shows an example of a fused image.

FIG. 7 shows a fused image. In FIG. 7, the current plurality of image detection areas superimposed on the image are shown for the sake of convenience of the description. However, the current plurality of image detection areas are not formed on the recording medium 200.

In this example, the first heating unit 1411 fuses (develops the color of) all of the image detection areas in the column a of the image formed with the decolorable toner on the recording medium 200 onto the recording medium 200. The third heating unit 1413 fuses all of the image detection areas in the column c of the image formed with the decolorable toner on the recording medium 200 onto the recording medium 200. The fifth heating unit 1415 fuses all of the image detection areas in the column e of the image formed with the decolorable toner on the recording medium 200 onto the recording medium 200. Meanwhile, the second heating unit 1412 decolorizes all of the image detection areas in the column b of the image formed with the decolorable toner on the recording medium 200. The fourth heating unit 1414 decolorizes all of the image detection areas in the column d of the image formed with the decolorable toner on the recording medium 200. The boundary between the color-developed part of the image and the decolorized part of the image corresponds to the boundary between heating units of the plurality of heating units. In the description below, the boundary between heating units of the plurality of heating units is also referred to simply as the boundary between heating units. The boundary between heating units coincides with the boundary between image detection areas in the main scanning direction of the current plurality of image detection areas. In the description below, the boundary between image detection areas in the main scanning direction of the current plurality of image detection areas is also referred to as the boundary between current image detection areas.

The control circuit 12 acquires an amount of misalignment $\Delta Z$ and a direction of misalignment between the boundary of current image detection areas and the boundary between heating units, as described below. The amount of misalignment $\Delta Z$ is the space between the boundary between current image detection areas and the boundary between heating units. The direction of misalignment is the direction in which the boundary between heating units is misaligned from the boundary between current image detection areas.

In an example, the control circuit 12 acquires the amount of misalignment $\Delta Z$ and the direction of misalignment based on an input of information about the misalignment. The information about the misalignment includes information representing the amount of misalignment $\Delta Z$ and information representing the direction of misalignment. The user checks the image formed with the decolorable toner and fused on the recording medium 200 and inputs the information about the misalignment using the touch panel 34.

In this example, the user measures the amount of misalignment $\Delta Z$ and the direction of misalignment, as described below. The user measures the amount of misalignment $\Delta Z$ and the direction of misalignment based on the center in the main scanning direction of the current plurality of image detection areas and the boundary between the color-developed part of the image and the decolorized part of the image. The center in the main scanning direction of the current plurality of image detection areas is equivalent to the center in the main scanning direction of the image formed on the recording medium 200. The user can grasp the center position in the main scanning direction based on the positions of the two ends in the main scanning direction of the image fused on the recording medium 200. Instead, if the image fused on the recording medium 200 includes a mark indicating the center in the main scanning direction, the user may grasp the center position in the main scanning direction based on the mark. The user measures a first distance from the center in the main scanning direction to the boundary between the color-developed part of the image and the decolorized part of the image located to the left of the center. The user measures a second distance from the center in the main scanning direction to the boundary between the color-developed part of the image and the decolorized part of the image located to the right of the center. The user compares the first distance with the second distance. If the first distance coincides with the second distance, the user determines that the boundary between heating units coincides with the boundary between current image detection areas. The user acquires 0 as the amount of misalignment $\Delta Z$ between the boundary between current image detection areas and the boundary between heating units. Meanwhile, if the first distance does not coincide with the second distance, the user determines that the boundary between heating units does not coincide with the boundary between current image detection areas. The user acquires half the difference between the first distance and the second distance as the amount of misalignment $\Delta Z$ between the boundary between current image detection areas and the boundary between heating units. The user measures the direction of misalignment by comparing the first distance with the second distance.

In the example shown in FIG. 7, the user determines that the first distance coincides with the second distance. The user determines that the boundary between heating units coincides with the boundary between current image detection areas. The user acquires 0 as the amount of misalignment $\Delta Z$ between the boundary between current image detection areas and the boundary between heating units. The boundary between heating units coincides with the boundary between current image detection areas in the main scanning direction. The current plurality of image detection areas coincide with the plurality of heating units of the fuser 140 in the main scanning direction. That is, the image detection areas in the column a coincide with the first heating unit 1411. The image detection areas in the column b coincide with the second heating unit 1412. The image detection areas in the column c coincide with the third heating unit 1413. The image detection areas in the column d coincide with the fourth heating unit 1414. The image detection areas in the column e coincide with the fifth heating unit 1415. Therefore, the user need not input the information about the misalignment using the touch panel 34. The storage 16 maintains the storage of the information about the current plurality of image detection areas.

In another example, the control circuit 12 acquires the amount of misalignment $\Delta Z$ and the direction of misalignment between the boundary between current image detection areas and the boundary between heating units using the image data generated by the scanner unit 50. It is assumed that the image data generated by the scanner unit 50 is image data based on an image fused on the recording medium 200 and scanned by the scanner unit 50. It is assumed that the image fused on the recording medium 200 is an image formed with the decolorable toner on the recording medium 200 and fused by the fuser 140. In this example, the control circuit 12 binarizes the pixel data of each pixel forming a line, on per line basis of image data. The control circuit 12 detects the state of the image fused on the recording medium 200 based on 1 (black pixel) or 0 (white pixel) of the binarized pixel data.

The control circuit 12 acquires the amount of misalignment $\Delta Z$ and the direction of misalignment based on a reference point in the main scanning direction of the current plurality of image detection areas and the detection of one or more boundaries between the color-developed part of the image and the decolorized part of the image on the recording medium 200. For example, the control circuit 12 acquires the amount of misalignment $\Delta Z$ and the direction of misalignment based on the center in the main scanning direction of the current plurality of image detection areas and the detection of a plurality of boundaries between the color-developed part of the image and the decolorized part of the image. The center in the main scanning direction of the current plurality of image detection areas is an example of the reference point in the main scanning direction of the current plurality of image detection areas.

The control circuit 12 acquires a first distance from the center in the main scanning direction to the boundary between the color-developed part of the image and the decolorized part of the image located to the left of the center. For example, the control circuit 12 detects the center in the main scanning direction of the image data generated by the scanner unit 50. The control circuit 12 detects a boundary between a part having consecutive black pixels and a part having consecutive white pixels located to the left of the center in the main scanning direction of the image data generated by the scanner unit 50. The boundary between a part having consecutive black pixels and a part having consecutive white pixels corresponds to the boundary between the color-developed part of the image and the decolorized part of the image. The control circuit 12 acquires the first distance based on the number of pixels between the center and the detected boundary. Similarly, the control circuit 12 detects a boundary between a part having consecutive black pixels and a part having consecutive white pixels located to the right of the center. The control circuit 12 acquires a second distance based on the number of pixels between the center and the detected boundary.

Also, for example, the control circuit 12 may acquire the first distance detected by the sensor 170. The sensor 170 may detect the center position in the main scanning direction based on the positions of the two ends in the main scanning direction of the image fused on the recording medium 200. If the image fused on the recording medium 200 includes a mark indicating the center in the main scanning direction, the sensor 170 may detect the center position in the main scanning direction based on the detection of the mark. The sensor 170 may detect the boundary between the color-developed part of the image and the decolorized part of the image based on the detection of the color-developed part of the image and the decolorized part of the image. The control circuit 12 may acquire the second distance from the center in the main scanning direction to the boundary between the color-developed part of the image and the decolorized part of the image located to the right of the center. The control circuit 12 may acquire the second distance detected by the sensor 170.

The control circuit 12 compares the first distance with the second distance. If the first distance coincides with the second distance, the control circuit 12 determines that the boundary between heating units coincides with the boundary between current image detection areas. The control circuit 12 determines 0 as the amount of misalignment ΔZ between the boundary between current image detection areas and the boundary between heating units. Meanwhile, if the first distance does not coincide with the second distance, the control circuit 12 determines that the boundary between heating units does not coincide with the boundary between current image detection areas. The control circuit 12 acquires half the difference between the first distance and the second distance as the amount of misalignment ΔZ between the boundary between current image detection areas and the boundary between heating units. The control circuit 12 acquires the direction of misalignment by comparing the first distance with the second distance.

In the example shown in FIG. 7, the control circuit 12 determines that the first distance coincides with the second distance. The control circuit 12 determines that the boundary between heating units coincides with the boundary between current image detection areas. The control circuit 12 acquires 0 as the amount of misalignment ΔZ between the boundary between current image detection areas and the boundary between heating units. The boundary between heating units coincides with the boundary between current image detection areas in the main scanning direction. The current plurality of image detection areas coincide with the plurality of heating units of the fuser 140 in the main scanning direction. Therefore, the control circuit 12 maintains the current plurality of image detection areas. The storage 16 maintains the storage of the information about the current plurality of image detection areas.

Figure 8:
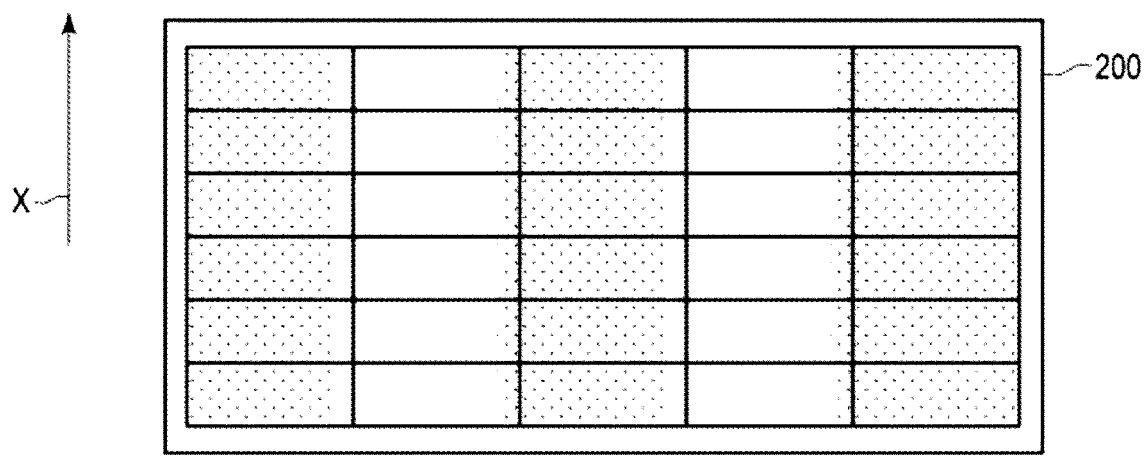
FIG. 8 shows an example of a fused image.

FIG. 8 shows an example of the fused image. In FIG. 8, the current plurality of image detection areas superimposed on the image are shown for the sake of convenience of the description. However, the current plurality of image detection areas are not formed on the recording medium 200.

In this example, the first heating unit 1411 fuses a part of the image detection areas in the column a of the image formed with the decolorable toner on the recording medium 200 onto the recording medium 200. The third heating unit 1413 fuses a part of the image detection areas in the column b and a part of the image detection areas in the column c of the image formed with the decolorable toner on the recording medium 200 onto the recording medium 200. The fifth heating unit 1415 fuses a part of the image detection areas in the column d and all of the image detection areas in the column e of the image formed with the decolorable toner on the recording medium 200 onto the recording medium 200. Meanwhile, the second heating unit 1412 decolorizes a part of the image detection areas in the column a and a part of the image detection areas in the column b of the image formed with the decolorable toner on the recording medium 200. The fourth heating unit 1414 decolorizes a part of the image detection areas in the column c and a part of the image detection areas in the column d of the image formed with the decolorable toner on the recording medium 200. The boundary between heating units does not coincide with the boundary between current image detection areas. The boundary between heating units is misaligned to the left from the boundary between current image detection areas.

In the example shown in FIG. 8, the control circuit 12 acquires the amount of misalignment ΔZ and the direction of misalignment based on an input of information about the misalignment. In this example, the user acquires, by measuring, half the difference between the first distance and the second distance as the amount of misalignment ΔZ between the boundary between current image detection areas and the boundary between heating units. The user measures the misalignment to the left as the direction of misalignment by comparing the first distance with the second distance. Instead, the control circuit 12 may acquire the amount of misalignment ΔZ and the direction of misalignment using the image data generated by the scanner unit 50. In this example, the control circuit 12 determines that the first distance does not coincide with the second distance. The control circuit 12 determines that the boundary between heating units does not coincide with the boundary between current image detection areas. The control circuit 12 acquires half the difference between the first distance and the second distance as the amount of misalignment ΔZ between the boundary between current image detection areas and the boundary between heating units. The control circuit 12 acquires the misalignment to the left as the direction of misalignment by comparing the first distance with the second distance. The control circuit 12 may acquire the amount of misalignment ΔZ and the direction of misalignment based on the detection by the sensor 170.

Figure 9:
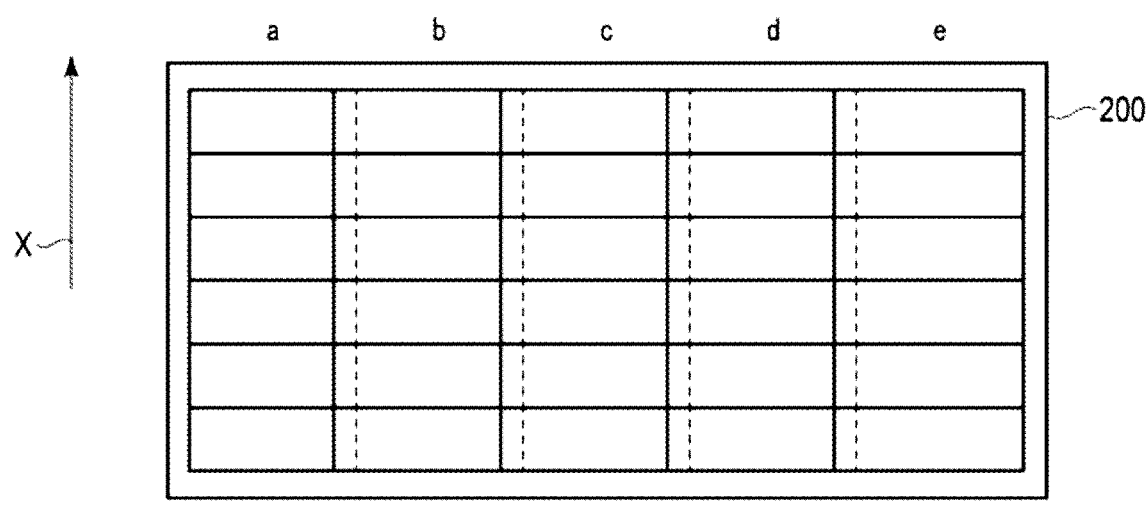
FIG. 9 shows another plurality of image detection areas.

FIG. 9 shows new plurality of image detection areas. In FIG. 9, the new plurality of image detection areas are shown by solid lines. The boundary between current image detection areas are shown by dashed lines.

The control circuit 12 changes the information about the current plurality of image detection areas based on the amount of misalignment ΔZ and the direction of misalignment that have been acquired. The control circuit 12 changes the information about the current plurality of image detection areas in such a way that the boundary between current image detection areas coincides with the boundary between heating units. Here, the control circuit 12 changes the position of the boundary between current image detection areas into the direction of misalignment by the amount of misalignment ΔZ. The control circuit 12 shifts the position of the boundary between current image detection areas to the left. The control circuit 12 changes the width Wa of the image detection areas in the column a to Z−ΔZ. The control circuit 12 maintains the width Wb of the image detection areas in the column b, the width Wc of the image detection areas in the column c, and the width Wd of the image detection areas in the column d, which are Z. The control circuit 12 changes the width We of the image detection areas in the column e to Z+ΔZ. Thus, the boundary between heating units coincides with the boundary between image detection areas of the new plurality of image detection areas in the main scanning direction. The new plurality of image detection areas coincide with the plurality of heating units of the fuser 140 in the main scanning direction. The control circuit 12 saves information about the new plurality of image detection areas in the storage 16. The storage 16 stores the information about the new plurality of image detection areas.

Figure 10:
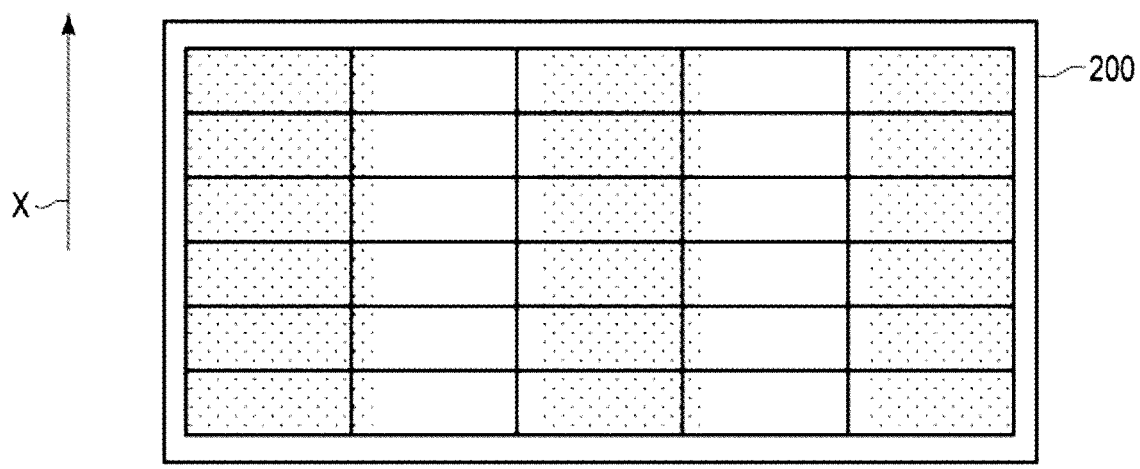
FIG. 10 shows an example of a fused image.

FIG. 10 shows an example of the fused image. In FIG. 10, the current plurality of image detection areas superimposed on the image are shown for the sake of convenience of the description. However, the current plurality of image detection areas are not formed on the recording medium 200.

In this example, the first heating unit 1411 fuses all of the image detection areas in the column a and a part of the image detection areas in the column b of the image formed with the decolorable toner on the recording medium 200 onto the recording medium 200. The third heating unit 1413 fuses a part of the image detection areas in the column c and a part of the image detection areas in the column d of the image formed with the decolorable toner on the recording medium 200 onto the recording medium 200. The fifth heating unit 1415 fuses a part of the image detection areas in the column e of the image formed with the decolorable toner on the recording medium 200 onto the recording medium 200. Meanwhile, the second heating unit 1412 decolorizes a part of the image detection areas in the column b and a part of the image detection areas in the column c of the image formed with the decolorable toner on the recording medium 200. The fourth heating unit 1414 decolorizes a part of the image detection areas in the column d and a part of the image detection areas in the column e of the image formed with the decolorable toner on the recording medium 200. The boundary between heating units does not coincide with the boundary between current image detection areas. The boundary between heating units is misaligned to the right from the boundary between current image detection areas.

In the example shown in FIG. 10, the control circuit 12 acquires the amount of misalignment ΔZ and the direction of misalignment based on an input of information about the misalignment. In this example, the user acquires half the difference between the first distance and the second distance as the amount of misalignment ΔZ between the boundary between current image detection areas and the boundary between heating units. The user measures the misalignment to the right as the direction of misalignment by comparing the first distance with the second distance. Instead, the control circuit 12 may acquire the amount of misalignment ΔZ and the direction of misalignment using the image data generated by the scanner unit 50. In this example, the control circuit 12 determines that the first distance does not coincide with the second distance. The control circuit 12 determines that the boundary between heating units does not coincide with the boundary between current image detection areas. The control circuit 12 acquires half the difference between the first distance and the second distance as the amount of misalignment ΔZ between the boundary between current image detection areas and the boundary between heating units. The control circuit 12 acquires the misalignment to the right as the direction of misalignment by comparing the first distance with the second distance. The control circuit 12 may acquire the amount of misalignment ΔZ and the direction of misalignment based on the detection by the sensor 170.

Figure 11:
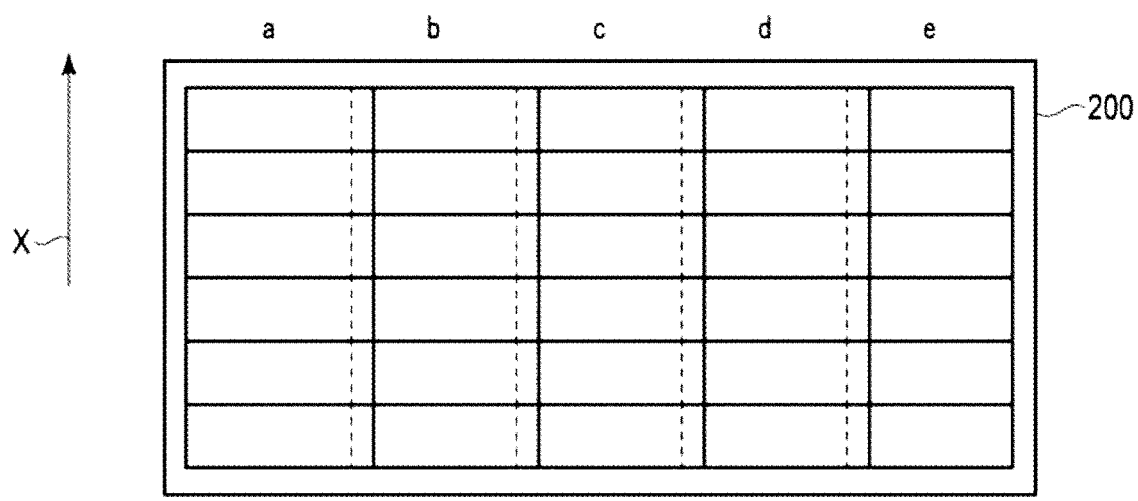
FIG. 11 shows another plurality of image detection areas.

FIG. 11 shows a new plurality of image detection areas. In FIG. 11, the new plurality of image detection areas are shown by solid lines. The boundary between current image detection areas are shown by dashed lines.

The control circuit 12 changes the information about the current plurality of image detection areas based on the amount of misalignment ΔZ and the direction of misalignment that have been acquired. The control circuit 12 changes the information about the current plurality of image detection areas in such a way that the boundary between current image detection areas coincides with the boundary between heating units. Here, the control circuit 12 changes the position of the boundary between current image detection areas into the direction of misalignment by the amount of misalignment ΔZ. The control circuit 12 shifts the position of the boundary between current image detection areas to the right. The control circuit 12 changes the width Wa of the image detection areas in the column a to Z+ΔZ. The control circuit 12 maintains the width Wb of the image detection areas in the column b, the width Wc of the image detection areas in the column c, and the width Wd of the image detection areas in the column d, which are Z. The control circuit 12 changes the width We of the image detection areas in the column e to Z−ΔZ. Thus, the boundary between heating units coincides with the boundary between image detection areas of the new plurality of image detection areas in the main scanning direction. The new plurality of image detection areas coincide with the plurality of heating units of the fuser 140 in the main scanning direction. The control circuit 12 saves information about the new plurality of image detection areas in the storage 16. The storage 16 stores the information about the new plurality of image detection areas.

Figure 12:
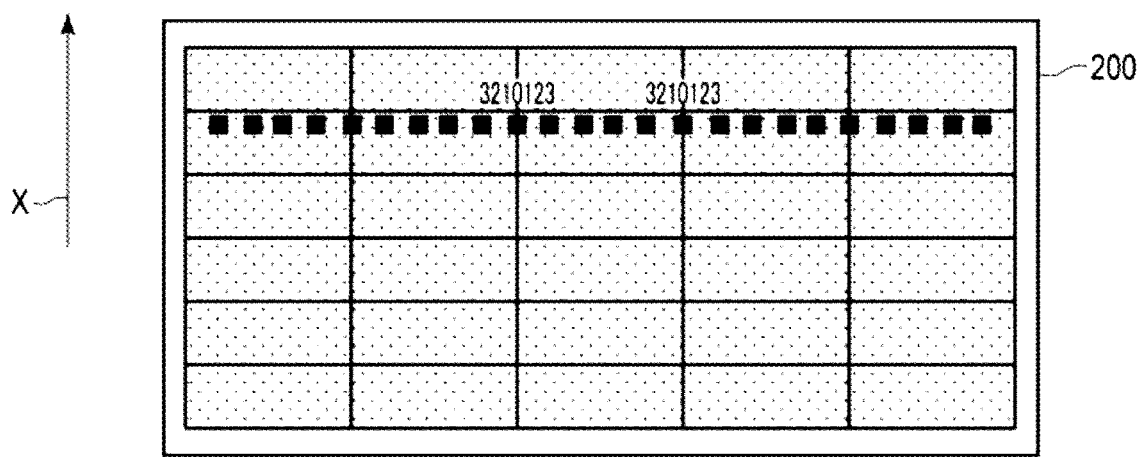
FIG. 12 shows an example of an image formed with a decolorable toner.

Another example of the image formed with the decolorable toner on the recording medium 200 will now be described. FIG. 12 shows an example of the image formed with the decolorable toner on the recording medium 200. In FIG. 12, the current plurality of image detection areas superimposed on the image are shown for the sake of convenience of the description. However, the current plurality of image detection areas are not formed on the recording medium 200. For example, the image forming unit 130 forms an image including a guide indicating the misalignment from the boundary between current image detection areas with a decolorable toner on the recording medium 200. The guide is an indication that enables identification of the amount of misalignment and the direction of misalignment in the main scanning direction from the boundary between current image detection areas. The guide may be a scale or number. The image forming unit 130 forms at least the guide with a decolorable toner on the recording medium 200. The image forming unit 130 may form an image where the boundary part between current image detection areas is not formed with a decolorable toner on the recording medium 200. This is to enable the control circuit 12 to detect the boundary part between current image detection areas.

In the example shown in FIG. 12, the image includes the guide superimposed on an image ranging over the maximum area in the main scanning direction and the maximum area in the sub scanning direction that can be formed on the recording medium 200. The image may include a guide with respect to at least one boundary between current image detection areas. The image may not include an image ranging over the maximum area in the main scanning direction and the maximum area in the sub scanning direction that can be formed on the recording medium 200.

Figure 13:
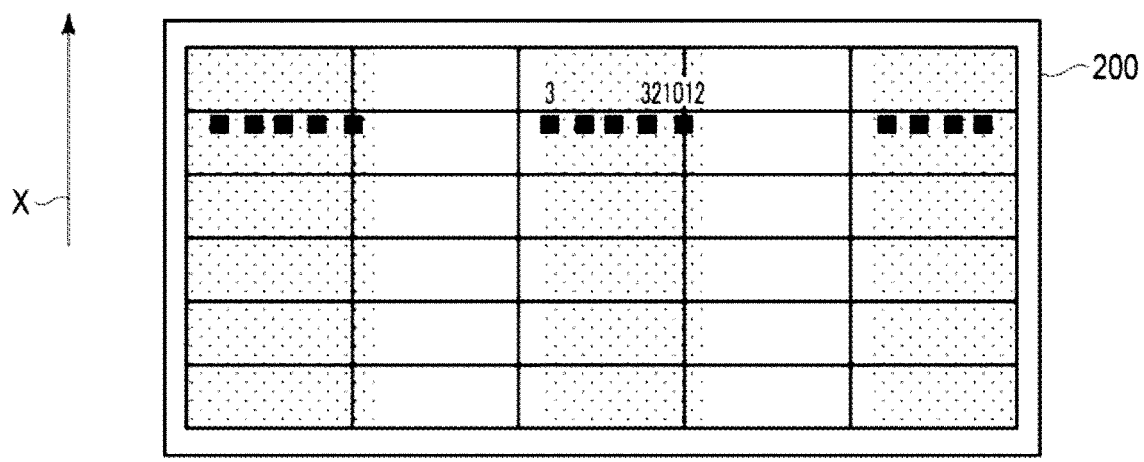
FIG. 13 shows an example of a fused image.

FIG. 13 shows an example of the fused image. FIG. 13 shows the state where the image shown in FIG. 12 is fused on the recording medium 200. In FIG. 13, the current plurality of image detection areas superimposed on the image are shown for the sake of convenience of the description. However, the current plurality of image detection areas are not formed on the recording medium 200. Here, it is assumed that the second heating unit 1412 and the fourth heating unit 1414 generate heat with the temperature at which the image is decolorized. It is assumed that the first heating unit 1411, the third heating unit 1413, and the fifth heating unit 1415 generate heat with the temperature at which the image is not decolorized.

The first heating unit 1411 fuses all of the image detection areas in the column a and a part of the image detection areas in the column b of the image formed with the decolorable toner on the recording medium 200 onto the recording medium 200. The third heating unit 1413 fuses a part of the image detection areas in the column c and a part of the image detection areas in the column d of the image formed with the decolorable toner on the recording medium 200 onto the recording medium 200. The fifth heating unit 1415 fuses a part of the image detection areas in the column e of the image formed with the decolorable toner on the recording medium 200 onto the recording medium 200. Meanwhile, the second heating unit 1412 decolorizes a part of the image detection areas in the column b and a part of the image detection areas in the column c of the image formed with the decolorable toner on the recording medium 200. The fourth heating unit 1414 decolorizes a part of the image detection areas in the column d and a part of the image detection areas in the column e of the image formed with the decolorable toner on the recording medium 200.

In the example shown in FIG. 13, the control circuit 12 acquires the amount of misalignment ΔZ and the direction of misalignment based on an input of information about the misalignment. In this example, the user measures the amount of misalignment ΔZ and the direction of misalignment between the boundary between current image detection areas and the boundary between heating units by comparing the boundary between heating units with the guide. By comparing the boundary between heating units with the guide, the user can easily grasp that the boundary between heating units does not coincide with the boundary between current image detection areas. Also, the user can easily grasp that the boundary between heating units is misaligned to the right by the amount of misalignment ΔZ from the boundary between current image detection areas.

Instead, the control circuit 12 acquires the amount of misalignment ΔZ and the direction of misalignment, using the image data generated by the scanner unit 50. In this example, the control circuit 12 acquires the amount of misalignment ΔZ and the direction of misalignment based on the detection of the boundary between current image detection areas and the boundary between the color-developed part of the image and the decolorized part of the image. The boundary between current image detection areas is an example of the reference point in the main scanning direction of the current plurality of image detection areas. For example, the control circuit 12 detects a part having one or a predetermined number of or fewer consecutive white pixels in the main scanning direction. The part having one or predetermined number of or fewer consecutive white pixels in the main scanning direction corresponds to the boundary part between current image detection areas. The control circuit 12 detects a pixel at the boundary between a part having consecutive black pixels and a part having consecutive white pixels in the main scanning direction. The boundary between a part having consecutive black pixels and a part having consecutive white pixels in the main scanning direction corresponds to the boundary between the color-developed part of the image and the decolorized part of the image. The control circuit 12 detects the distance between the boundary between current image detection areas and the boundary between the color-developed part of the image and the decolorized part of the image, based on the number of pixels between the two detected points. The control circuit 12 acquires the amount of misalignment ΔZ based on the distance between the boundary between current image detection areas and the boundary between the color-developed part of the image and the decolorized part of the image. The control circuit 12 acquires the direction of misalignment based on the positional relationship between the two detected points in the main scanning direction.

The control circuit 12 may acquire the amount of misalignment ΔZ and the direction of misalignment based on the detection by the sensor 170. The sensor 170 may detect the boundary between current image detection areas based on the guide. The sensor 170 may detect the boundary between the color-developed part of the image and the decolorized part of the image based on the detection of the color-developed part of the image and the decolorized part of the image. The sensor 170 may detect the distance between the boundary between current image detection areas and the boundary between the color-developed part of the image and the decolorized part of the image. The control circuit 12 may acquire the direction of misalignment based on the positional relationship between the boundary between current image detection areas and the boundary between the color-developed part of the image and the decolorized part of the image.

The image forming unit 130 may not necessarily form the guide with a decolorable toner on the recording medium 200. The image forming unit 130 may form an image showing the boundary between current image detection areas with a decolorable toner on the recording medium 200. In an example, the image forming unit 130 forms an image showing the boundary part between current image detection areas in an identifiable form with a decolorable toner on the recording medium 200. In another example, the image forming unit 130 forms an image in which the boundary part between current image detection areas is not formed, with the decolorable toner on the recording medium 200. The example where the control circuit 12 acquires the amount of misalignment ΔZ and the direction of misalignment using the image data generated by the scanner unit 50, is the latter form.

In an example, the control circuit 12 acquires the amount of misalignment ΔZ and the direction of misalignment based on an input of information about the amount of misalignment. In this example, the user measures the amount of misalignment ΔZ and the direction of misalignment by comparing the boundary between heating units with the boundary between current image detection areas. By comparing the boundary between heating units with the boundary between current image detection areas, the user can easily grasp that the boundary between heating units does not coincide with the boundary between current image detection areas. Also, by comparing the boundary between heating units with the boundary between current image detection areas, the user can easily grasp the amount of misalignment ΔZ and the direction of misalignment. In another example, the control circuit 12 acquires the amount of misalignment ΔZ and the direction of misalignment based on the detection of the boundary between current image detection areas and the boundary between the color-developed part of the image and the decolorized part of the image, as in the above example.

Setting of a Plurality of Image Detection Areas

Figure 14:
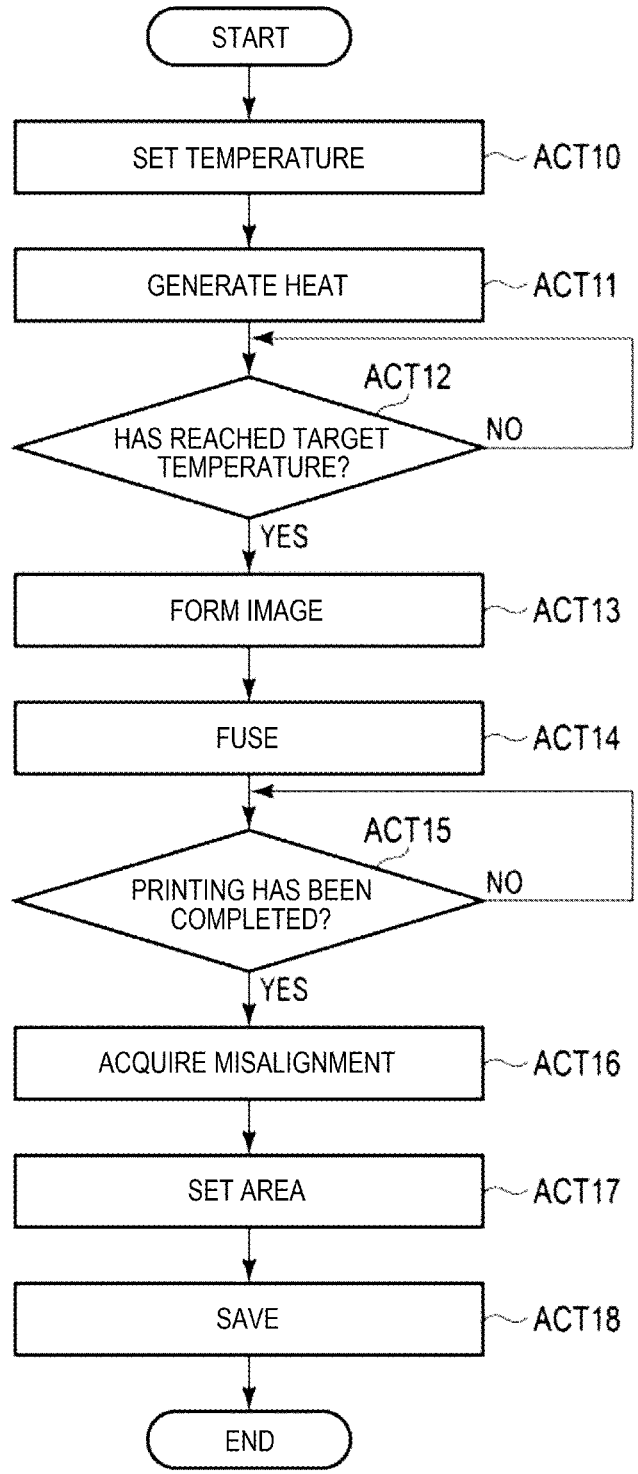
FIG. 14 is a flowchart showing an example of processing procedures for setting a plurality of image detection areas.

FIG. 14 is a flowchart showing an example of processing procedures for setting a plurality of image detection areas in the image forming device 1. For example, the setting of the plurality of image detection areas is an operation carried out at the time of shipping the image forming device 1. The processing procedures described below are simply an example. Each process may be changed as much as possible. In the processing procedures, each process can be omitted or replaced according to the form of embodiment that is employed, and another process can be added as well.

The control circuit 12 sets a temperature of the plurality of heating units of the fuser 140 (ACT 10). In ACT 10, for example, the control circuit 12 sets a temperature at which the image is decolorized and a temperature at which the image is not decolorized, alternately in order of arrangement of the plurality of heating units. Here, the control circuit 12 sets the temperature at which the image is decolorized as a target temperature for the second heating unit 1412 and the fourth heating unit 1414. The control circuit 12 sets the temperature at which the image is not decolorized as a target temperature for the first heating unit 1411, the third heating unit 1413, and the fifth heating unit 1415. The plurality of heating units of the fuser 140 generate heat with the temperature at which the image is decolorized or with the temperature at which the image is not decolorized. Thus, the fuser 140 can form the boundary between heating units of the plurality of heating units on the recording medium 200.

The control circuit 12 causes the plurality of heating units of the fuser 140 to generate heat with their respective target temperatures (ACT 11). In ACT 11, for example, the control circuit 12 controls the fuser 140 to cause the plurality of heating units to generate heat with their respective target temperatures. The control circuit 12 determines whether the temperature of each of the plurality of heating units of the fuser 140 has reached the target temperature or not (ACT 12). If the temperature of each of the plurality of heating units has not reached the target temperature (NO in ACT 12), the control circuit 12 waits until the target temperature is reached. If the temperature of each of the plurality of heating units has reached the target temperature (YES in ACT 12), the control circuit 12 forms an image with a decolorable toner on the recording medium 200 (ACT 13). In ACT 13, for example, the control circuit 12 controls the image forming unit 130 to form the image shown in FIG. 6 with a decolorable toner on the recording medium 200. Thus, the image forming unit 130 forms the image based on the image data with a decolorable toner on the recording medium 200.

The control circuit 12 fuses the image formed with the decolorable toner onto the recording medium 200 (ACT 14). In ACT 14, for example, the control circuit 12 controls the conveyor unit 120 to convey the recording medium 200 having the image formed thereon with the decolorable toner to the fuser 140. The image is fused onto the recording medium 200 as illustrated in FIG. 7, 8, or 10 depending on the difference in temperature between the plurality of heating units. The image is formed of a color-developed part and a decolorized part.

The control circuit 12 determines whether the printing has been completed or not (ACT 15). In ACT 15, for example, the control circuit 12 determines whether the printing has been completed or not according to whether the recording medium 200 has passed through the fuser 140 or not. If the printing has not been completed (NO in ACT 15), the control circuit 12 waits until the printing is completed. If the printing has been completed (YES in ACT 15), the control circuit 12 acquires the amount of misalignment ΔZ and the direction of misalignment (ACT 16). In ACT 16, in an example, the control circuit 12 acquires the amount of misalignment ΔZ and the direction of misalignment based on an input of information about the misalignment, as described above. In this example, the control circuit 12 can set a plurality of image detection areas corresponding to the plurality of heating units of the fuser 140 in response to an input by the user. In another example, the control circuit 12 acquires the amount of misalignment ΔZ and the direction of misalignment using the image data generated by the scanner unit 50. In this example, the control circuit 12 can accurately set a plurality of image detection areas corresponding to the plurality of heating units of the fuser 140.

The control circuit 12 sets information about the plurality of image detection areas based on the amount of misalignment ΔZ and the direction of misalignment (ACT 17). In ACT 17, for example, the control circuit 12 changes the position of the boundary between current image detection areas into the direction of misalignment by the amount of misalignment ΔZ. The control circuit 12 sets a positional relationship between the plurality of heating units of the fuser 140 and the plurality of image detection areas and thus sets the information about the plurality of image detection areas. The control circuit 12 saves the information about the plurality of image detection areas in the storage 16 (ACT 18). In ACT 18, for example, the control circuit 12 saves the information about the plurality of image detection areas set in ACT 17 in the storage 16. The storage 16 stores the information about the plurality of image detection areas.

According to this embodiment, the control circuit 12 sets the plurality of image detection areas corresponding to the plurality of heating units of the fuser 140 based on the degree of color development or decolorization by the fuser 140 of the image formed on the recording medium 200. Thus, when printing, the image forming device 1 can cause the plurality of heating units of the fuser 140 to selectively generate heat according to the area where an image is formed. As the image forming device 1 causes only the necessary heating unit(s) to generate heat, the load on the fuser 140 is reduced and energy-saving is achieved.

Selection of Heating Unit

Figure 15:
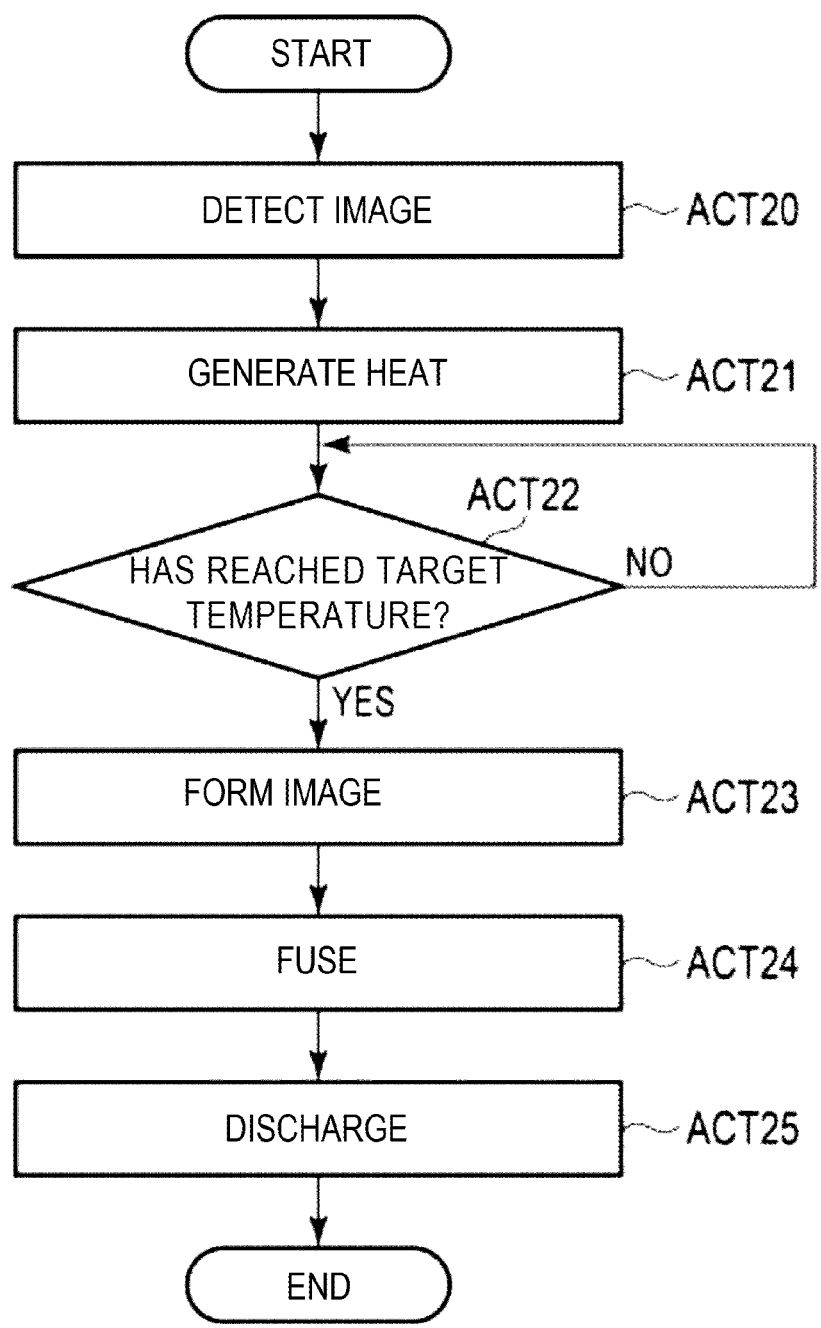
FIG. 15 is a flowchart showing an example of processing procedures for selecting a heating unit.

FIG. 15 is a flowchart showing an example of processing procedures for selecting a heating unit in the image forming device 1. For example, selecting a heating unit is an operation of the image forming device 1 at the time of printing. The processing procedures described below are simply an example. Each process may be changed as much as possible. In the processing procedures, each process can be omitted or replaced according to the form of embodiment that is employed, and another process can be added as well.

The control circuit 12 detects presence or absence of a print target image in each of the plurality of image detection areas (ACT 20). In ACT 20, for example, the control circuit 12 detects presence or absence of a print target image in each of the plurality of image detection areas based on the result of counting by the pixel counter 160. For example, it is assumed that the control circuit 12 has detected a print target image in the image detection areas in the column b and the image detection areas in the column c. It is assumed that the control circuit 12 has not detected a print target image in the image detection areas in the column a, the image detection areas in the column d, and the image detection areas in the column e.

The control circuit 12 causes one or more heating units of the plurality of heating units of the fuser 140 to generate heat (ACT 21). The one or more heating units are heating units corresponding to one or more image detection areas where a print target image is detected of the plurality of image detection areas. For example, the control circuit 12 sets a temperature at which the print target image is fused onto the recording medium 200 as a target temperature for the second heating unit 1412 corresponding to the image detection areas in the column b. Similarly, the control circuit 12 sets a temperature at which the print target image is fused onto the recording medium 200 as a target temperature for the third heating unit 1413 corresponding to the image detection areas in the column c. The control circuit 12 controls the fuser 140 to cause the second heating unit 1412 and the third heating unit 1413 to generate heat with the target temperature. The control circuit 12 does not cause the first heating unit 1411, the fourth heating unit 1414, and the fifth heating unit 1415 to generate heat.

The control circuit 12 determines whether the temperature of the one or more heating units as heat generation targets, of the plurality of heating units of the fuser 140, has reached the target temperature or not (ACT 22). If the temperature of the one or more heating units as heat generation targets has not reached the target temperature (NO in ACT 22), the control circuit 12 waits until the target temperature is reached. If the temperature of the one or more heating units as heat generation targets has reached the target temperature (YES in ACT 22), the control circuit 12 forms the print target image on the recording medium 200 (ACT 23). In ACT 23, for example, the control circuit 12 controls the image forming unit 130 to form the print target image with a non-decolorable toner or a decolorable toner on the recording medium 200. Thus, the image forming unit 130 forms the print target image based on the image data with a non-decolorable toner or a decolorable toner on the recording medium 200.

The control circuit 12 fuses the print target image onto the recording medium 200 (ACT 24). In ACT 24, for example, the control circuit 12 controls the conveyor unit 120 to convey the recording medium 200 having the print target image formed thereon to the fuser 140. The second heating unit 1412 and the third heating unit 1413 are generating heat. The boundary between heating units coincides with the boundary between current image detection areas in the main scanning direction. Therefore, the fuser 140 can fuse the print target image present in the image detection areas in the column b and the image detection areas in the column c onto the recording medium 200. The control circuit 12 discharges the recording medium (ACT 25). In ACT 25, for example, the control circuit 12 controls the conveyor unit 120 to discharge the recording medium 200 having the image fused thereon to the paper discharge unit 180.

According to this embodiment, the control circuit 12 causes one or more heating units of the plurality of heating units of the fuser 140 corresponding to one or more image detection areas where a print target image is detected to generate heat. Thus, when printing, the image forming device 1 can cause the plurality of heating units of the fuser 140 to selectively generate heat according to the area where an image is formed. As the image forming device 1 causes only the necessary heating unit(s) to generate heat, the load on the fuser 140 is reduced and energy-saving is achieved.

In this embodiment, an example where the image forming device 1 has the decolorable development unit 135 is described. However, this is not limiting. The image forming device 1 may not have the decolorable development unit 135. In this example, a recording medium having an image printed with a decolorable toner by another machine may be prepared, and the image forming device 1 may heat this recording medium with the fuser 140 in the foregoing manner. In this embodiment, an example where the recording medium 200 having an image formed thereon with a decolorable toner is used is described. However, this is not limiting. The image forming device 1 may heat thermal paper with the fuser 140 in the foregoing manner.

While certain embodiments have been described, these embodiment have been presented by way of example only, and are not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A device comprising:
    a fuser configured to generate heat in a plurality of regions extending in a direction orthogonal to a direction of conveyance of a recording medium;
    a memory configured to store a correspondence between the plurality of regions and positions of a plurality of areas positioned along a main scanning direction in the image data, the main scanning direction corresponding with the direction orthogonal to the direction of conveyance;
    a control panel configured to receive an input regarding an amount of misalignment and a direction of misalignment, the amount of misalignment indicating a space between a first boundary between the plurality of regions and second boundary between the plurality of areas, the direction of misalignment indicating a direction in which the first boundary is misaligned from the second boundary; and
    a control circuit configured to:
        change the correspondence between the plurality of regions and positions of the plurality of areas stored in the memory based on the amount of misalignment and the direction of misalignment;

detect a presence or an absence of a print target image in each of the plurality of areas; and cause the fuser to generate heat in one or more regions of the plurality of regions corresponding to one or more areas of the plurality of areas where the print target image is detected.

2. The device of claim 1, wherein the fuser includes a plurality of heating units, and wherein each of the plurality of heating units corresponds with a respective one of the plurality of regions.

3. The device of claim 2, wherein the plurality of heating units have the same width.

4. The device of claim 2, wherein the plurality of heating units includes a first heating unit and a second heating unit, and wherein the first heating unit has a first width and the second heating unit has a second width different than the first width.

5. The device of claim 4, wherein the plurality of heating units includes a third heating unit, wherein the second heating unit is positioned between the first heating unit and the third heating unit, and wherein the third heating unit has the first width.

6. The device of claim 1, wherein the control panel includes at least one of a touch panel or one or more buttons configured to receive the input from an operator.

* * * * *